April 18, 1961     G. B. JOHNSON     2,979,805
CUT-OFF TOOL
Filed July 1, 1957
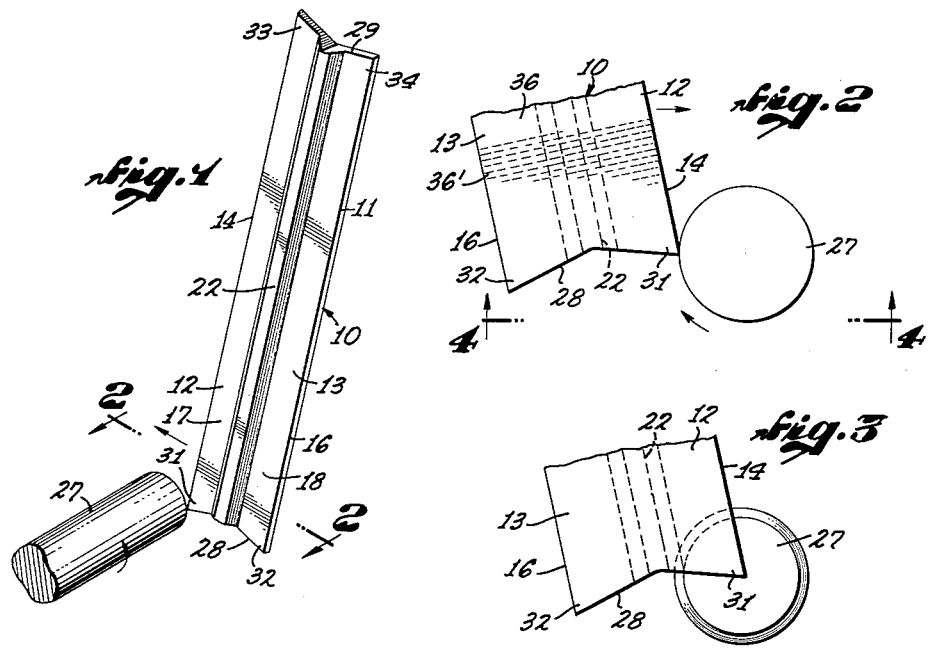
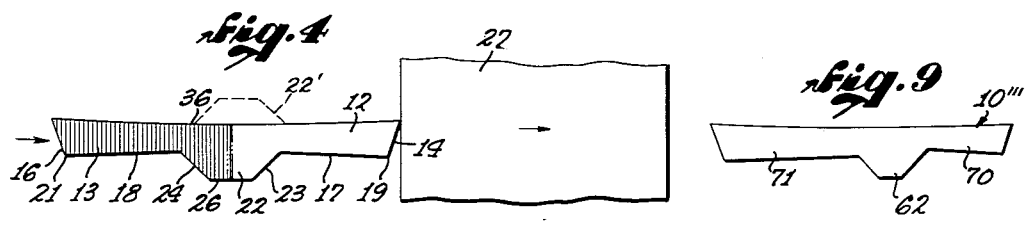
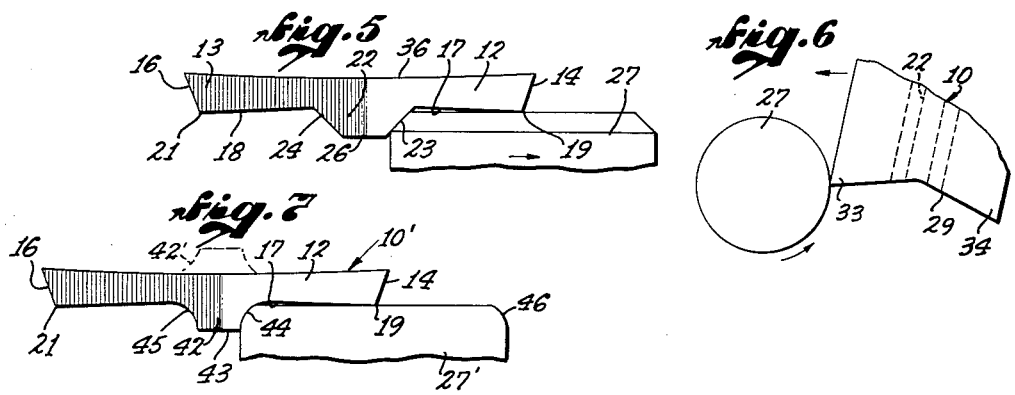
GEORGE B. JOHNSON,
INVENTOR.
HERZIG & JESSUP,
ATTORNEYS.
BY
Albert M. Herzig

United States Patent Office 2,979,805
Patented Apr. 18, 1961

2,979,805
CUT-OFF TOOL

George B. Johnson, 2776 Clearwater St., Los Angeles, Calif.

Filed July 1, 1957, Ser. No. 669,151

8 Claims. (Cl. 29—95)

This invention relates to a cut-off tool and has particular reference to a double bit, cut-off tool for making cut-offs on solid or hollow shafts which are rotated as by a lathe, automatic screw machine, or the like.

Cut-off tools are generally used in machining practice to cut off excess material from a work piece which has been machined to a desired configuration as in a lathe, automatic screw machine, or the like. Such tools are securely supported as in a tool holder of suitable design which is capable of selective transverse movement, relative to the bed stock of the lathe, to feed the tool into the workpiece as the latter is being rotated by the chuck of the lathe. The workpiece is severed from the original stock to complete the machining operation and provide a finished part.

It is preferable that an end thus secured is free from burrs and sharp edges, and it is advantageous if the cut-off operation includes a means for additionally automatically producing an end that is sufficiently chamfered to remove any burrs or sharp edges produced during the cut-off operation.

It is therefore an object of this invention to provide a new and improved cut-off tool which provides a cutting edge to make a cut-off on a shaft, or the like, and also provides means for automatically chamfering the end to remove any burrs or sharp edges produced during the cut-off.

Cut-off tools of the character described, are generally expensive to produce, and a large assortment of tools of varied sizes is required to be maintained by a machine operator, in order to meet the requirements of the various sizes of work pieces which the operator encounters.

It is therefore a further object of this invention to provide a new and improved cut-off tool which incorporates in a unitary piece, a plurality of cutting edges which are suitable for work pieces of various sizes.

It is another object of this invention to provide an elongated cut-off blade of uniform cross-section throughout having a reinforcing rib extending therealong provided with a finish cutting surface positioned to finish cut the rim of the stock as an incident to the final stage of the cut-off operation and which blade can be sharpened repeatedly until substantially the entire blade has been consumed in use.

A still further object of this invention is to provide a new and improved cutting tool of the character described in which the means for chamfering the cut-off end of the workpiece may include various shapes and forms to result in desired chamfer configuration.

A further object of this invention is to provide a cutting tool as described which provides clearance recesses therein for more efficient cutting and chamfering operations.

Yet another object of this invention is to provide a new and improved cut-off tool which may be fed into the workpiece tangentially for the greatest advantage in the machining operation.

A general object of this invention is to provide a new and improved cut-off tool which overcomes disadvantages of prior methods and devices heretofore intended to accomplish generally similar purposes, i.e., for making cut-offs on workpieces as a final step in machining operations.

These and other objects of this invention will be more readily apparent to one skilled in the art, from the following detailed description of the drawings, and appended claims.

In the drawings:

Figure 1 is a perspective view in elevation, illustrating the cut-off tool, in accordance with this invention, in a position relative to a shaft to be cut off;

Figure 2 is an enlarged fragmentary view in elevation as seen on the lines 2—2 of Figure 1, illustrating the starting position of the cut-off tool relative to the shaft;

Figure 3 is an enlarged fragmentary view, similar to Figure 2, illustrating the position of the cut-off tool relative to the shaft at the end of the cut-off operation;

Figure 4 is an enlarged view in elevation as seen on a line 4—4 of Figure 2, illustrating the relationship of the cut-off tool to a shaft as seen from the underside of said parts;

Figure 5 is an enlarged view, in elevation, similar to Figure 4, illustrating the chamfering position of the cut-off tool relative to the shaft;

Figure 6 is an enlarged view, in elevation, illustrating the application of the cut-off tool relative to a shaft which is rotating in a direction opposite to that shown in Figure 2.

Figure 7 is an enlarged view in elevation, similar to Figure 5, showing a modified embodiment of the cut-off tool in accordance with this invention;

Figure 8 is an enlarged view in elevation, similar to Figure 5, showing another modified embodiment of the cut-off tool; and Figure 9 is an enlarged end view in elevation of a further modified embodiment of the invention.

Referring more particularly to the drawings, there is shown, by way of illustration but not of limitation, a cut-off tool indicated generally by the numeral 10, which includes an elongated body 11, having a substantially rectangular configuration.

The body 11 includes a pair of cutters 12 and 13 extending parallel to one another for the full length of the body. It is to be understood that the body 11 may originate in a shorter form than illustrated, however, it is preferably provided with a length sufficient to provide a long life span to the tool despite repeated resharpening operations.

As best seen in Figure 4, the cutters 12, 13 are defined by beveled edges 14 and 16, respectively, and faces 17, 18, respectively. The faces 17 and 18 are preferably sloped inwardly from the outer corners 19 and 21 towards the center of the body, and terminate at the base of a double-beveled ridge or rib 22 longitudinally disposed on the side face 17—18 of the tool body.

The ridge 22 which substantially enhances the rigidity of the tool includes a substantially flat outer surface 26 and a pair of sloped surfaces 23 and 24 to form the aforementioned double-bevel.

The sloped faces 17, 18, and edges 14, 16, form clearance recesses for the material encountered by the cut-off tool when presented to the workpiece, indicated at 27, to prevent over-heating of the tool bit or galling or scratching of the surface of the workpiece during the cut-off operation. Additional clearance cut-outs are provided in V-shaped form at the ends 28, 29 of the body 11 to prevent accumulation of material at these points during the cut-off operation.

The beveled edge 14, the recessed face 17 and the cut-away end 28, form a sharpened point 31 to facilitate biting of the tool 10 into the workpiece 27. Additional sharpened points 32, 33 and 34, are likewise formed at the remaining corners of the body to provide a plurality of discrete sharpened and pointed cutters on the unitary body 11.

The ridge 22 may be of any suitable configuration, as the flat beveled construction described, and surfaces 23, 24 are preferably spaced different distances from the beveled edges 14, 16 to correspond to the radius of two slightly different diameter workpieces. For example, cutter blade 12 and its associated chamfer forming surface 23 are suitable for cutting off a workpiece from stock of a smaller diameter than is cutter blade 13 and its associated chamfer forming surface 24. Thus, it will be understood that each cutter blade and chamfer forming surface are used most effectively with stock of a rather narrow diameter.

The back face 36 of the body 11 is preferably recessed as by hollow grinding or the like to provide clearance for workpiece material in this area, and may be provided with transverse or other serrations to facilitate clamping in a tool-holder, as indicated by the dotted lines 36'.

As illustrated in Figures 1 through 3, the cut-off tool 10 is positioned in a tool holder (not shown) at an acute angle to the vertical center line of the workpiece, and tangent thereto. As the workpiece 27 is rotated within the chuck of the lathe (not shown), the tool 10 is advanced towards the workpiece 27 by conventional means incorporated in the lathe to cause the tool to bite into the workpiece 27 and begin the cut-off operation. As the tool bit is further advanced towards the center line of the workpiece a position of the tool bit is ultimately reached where the beveled edge, like 23, is brought into contact with the cut off peripheral edge of the workpiece 27 to break or chamfer the corner as desired. The width of the tool piece, i.e., the distance between the beveled side 14 and the beveled edge 23, may be of a dimension suitable to the amount of bevel desired in the finished part. As an example, the width of the cutter 12 may be such that when the edge 19 is on or slightly past the axis of the workpiece 27, the beveled edge 23 of the ridge 22 barely touches the peripheral edge of the cut-off made to barely engage the edge and remove any burrs which may be present. If a larger bevel is desired, the distance between the aforementioned beveled faces may be decreased, or the cut-off tool advanced further over the center line to cut off a larger chamfer at the peripheral edge of the workpiece.

As best seen in Figure 6, if the rotation of the workpiece is in a counter-clockwise direction, as seen in this figure, the cut-off tool may be reversed in the tool holder to bring the opposite point 33 of the cutter 12 into engagement with the workpiece. The cutter is then presented from the right side of the workpiece 27 to present the point 33 in opposition to the rotation of the workpiece 27.

The cutter 13, may advantageously be formed with the beveled edge 16 of a different dimensional spacing from the ridge 22 to facilitate the cut-off of a shaft which is different in size from the shaft cut off by the blade 12, providing a more versatile tool which can be used to cut off more than one size of shaft. The cutters 12 and 13 may additionally be of different dimensional thickness, to provide a more suitable tool for the various sized workpieces to be cut off. As an example, as illustrated in Fig. 9, one cutter may be thinner than the other for use in smaller workpieces and the other cutter thicker as for larger workpieces.

The ridge 22 of the body 11 also serves the purpose of reinforcing the body, to stiffen the body and prevent breakage thereof. By the use of a ridge, as described, a somewhat thinner cutter can be provided without the danger of breakage due to a thinner cross-section, as is common to prior art cut-off tools. The ridge 22 is further useful in supplying a clamping surface for the clamping means normally incorporated in a tool holder such as is commonly used in lathes or the like. The ridge also serves as a means for retaining the tool in proper relationship with the workpiece as in cooperation with a suitable groove or slot provided in a tool holder.

As previously mentioned, the ridge 22 may take a variety of shapes and forms to provide a desired contour to the edge of the cut-off workpiece. As best seen in Figure 7, a modified form of cut-off tool, designated by the numeral 10' is shown, wherein like parts are referred to by like numbers, and which includes a ridge 42 which has a flat, or other, outer surface 43 and rounded or curved surfaces 44, 45. A somewhat rounded appearance, as indicated at 46, is given to the edge of the workpiece 27' as a result.

Referring to Figure 8, another modified embodiment of the cut-off tool, designated by the numeral 10", is illustrated wherein a ridge 52 is disposed adjacent the beveled face 14' and spaced at a greater distance from the beveled surface 16. If a rounded configuration of the workpiece 27" is desired after the cut off operation, a half-round configuration is given to the surface 53 of the ridge 52, and any desired configuration is incorporated in the opposed surface 54 of the ridge 52. After the workpiece 27" is cut off as by a cutter 56 of the cut-off tool, the tool bit can be reversed in the tool holder to present the face 14', identical to the face 14 of the first embodiment, to the workpiece 27 and round the edge 57 as by the curved surface 53 of the ridge 52. Thus, it will be apparent from the foregoing description of the various forms of ridges 22, 42 and 52, that any desired shape or configuration can be given to the edge of the workpiece simultaneously with and as an incident to the completion of the cut-off operation.

If desired, the ridge 52 may be of any shape as heretofore noted, not only in the form of Figure 8, but the various shaped cutting and shaping edges can be varied and interchanged throughout the embodiments shown or described, within the skill of the art and in the light of the instant teaching.

Also, a forming face 61, complementary to the surface 53, for example, can be formed on the opposite side 36, shown in dotted outline, e.g., in Figure 8.

Likewise, the ridges 22, 42, and the like, are sometimes advantageously formed on both sides of the cutting tool, preferably but not necessarily, directly opposed to one another, as shown by way of example in dotted lines 22', 42', and 52', in Figures 4, 7 and 8 respectively. Thereby radii or other edges can be formed on the cut-off part as well as on the stock, simultaneously in the cut-off operation, and these may be different, if desired, for each cutting edge, so that, for example, four differently shaped cutting bits or edges can be provided, two at each end of the cutting tool.

Referring to Figure 9, there is shown a slightly modified form of cut-off tool 10''', wherein one of the longitudinal cutters indicated by the numeral 70 is appreciably narrower than an opposed cutter 71. By use of a reinforcing ridge 62, similar to ridges 22, 42 and 52, a substantially thinner section is possible for the cutter 70 for use in making a cut-off on a shaft of a smaller diameter, without breakage of the tool.

An important feature of this invention, as will now be more clearly understood, is the provision of parallel longitudinal and continuous cutter faces and ridges, which require no more than one operation to sharpen. As the tools 10, 10', 10", and 10''' are sharpened, by grinding the V-shaped cutouts 28, 29, the component elements of the cutters are automatically sharpened, merely shortening the body, giving the tool an exceptionally long life heretofore unknown to the art.

While I have herein shown and described what I conceived to be the most desired embodiments of my invention, it is to be understood that alterations and modifications thereof may be made to satisfy the spirit of my In the claims:

1. An article of manufacture comprising a cut-off tool adapted to be rigidly clamped in the tool holder of a machine tool for cutting off a workpiece and simultaneously performing a finish cutting operation on the end of the stock as the tool completes the cut-off operation, said tool being of the type having a long straight blade of uniform cross-section from end to end thereof and having a beveled cut-off edge formed along its lateral edge, said blade being relieved along its opposite faces to provide clearance with the side walls of a cut as the tool is fed into the stock undergoing cutting, said blade being characterized by the provision of a reinforcing rib extending longitudinally thereof parallel to said lateral cut-off edge of the blade by a distance generally corresponding to the radius of the stock to be cut into individual pieces, the lateral edge of said rib adjacent said cut-off edge being a finish cutting edge adapted to engage and finish cut the end rim edge of the stock as said cut-off edge of the blade approaches and completes a workpiece cut-off operation.

2. An article of manufacture as defined in claim 1 characterized in that said reinforcing rib is spaced between the opposite lateral edges of said blade, and further characterized in that both lateral edges of said blade are beveled and effective as cut-off edges and in that the edge of said reinforcing rib adjacent each beveled edge cooperates therewith in providing a finish cutting edge.

3. An article of manufacture as defined in claim 1 characterized in that said blade is provided at its ends with oppositely-facing wide shallow V-shaped notches, both lateral edges of said blade being spaced from the opposite sides of said reinforcing rib, and the opposite lateral edges each being contoured to provide a finish cutting edge each adapted to engage and finish cut the rim edge of the stock as the adjacent associated cut-off edge of the blade completes a workpiece cut-off operation.

4. An article as defined in claim 3 characterized in that the finish cutting edges of said reinforcing rib are spaced different distances from the associated cut-off edge whereby said blade is adapted for use with workpieces of different sizes.

5. An article as defined in claim 2 characterized in that said reinforcing rib and its finish cutting edges are offset to one side of the longitudinal axis of said blade thereby accommodating said blade for use in cut-off operations on workpieces of different diameter.

6. An article as defined in claim 5 characterized in that the face of said blade opposite said reinforcing rib is hollowground and in that the portions of said blade adjacent the opposite sides of said reinforcing rib are thinner than the portions adjacent the associated beveled cutting edges thereof.

7. An article as defined in claim 2 characterized in that said reinforcing rib is confined to one of the broad side faces of said blade.

8. An article as defined in claim 7 characterized in that the broad face of said blade on the opposite side thereof from said reinforcing rib is provided with serrations adapted to cooperate with the roughened surface of a tool holder clamping means in holding said blade anchored against displacement longitudinally of the blade in the holder.

References Cited in the file of this patent

UNITED STATES PATENTS

| | | |
|---|---|---|
| 169,913 | Martin | Nov. 16, 1875 |
| 641,997 | Preston | Jan. 23, 1900 |
| 1,223,438 | Spencer | Apr. 24, 1917 |
| 1,695,955 | Frayer | Dec. 18, 1928 |
| 1,701,980 | Luers | Feb. 12, 1929 |
| 1,835,958 | Luers | Dec. 8, 1931 |
| 1,855,971 | Kilmer | Apr. 26, 1932 |
| 2,335,570 | Montgomery | Nov. 30, 1943 |
| 2,370,273 | Ulliman | Feb. 27, 1945 |
| 2,679,679 | Metzler | June 1, 1954 |